US005667579A

United States Patent [19]

Oehlert et al.

[11] Patent Number: 5,667,579
[45] Date of Patent: Sep. 16, 1997

[54] THERMALLY STABLE IRON OXIDE PIGMENTS, A PROCESS FOR THEIR PREPARATION AND THEIR USE

[75] Inventors: Wolfgang Oehlert, Krefeld; Friedrich Jonas, Aachen; Gunter Buxbaum, Krefeld, all of Germany

[73] Assignee: Bayer AG, Leverkusen, Germany

[21] Appl. No.: 658,311

[22] Filed: Jun. 5, 1996

Related U.S. Application Data

[63] Continuation of Ser. No. 269,560, Jul. 1, 1994, abandoned.

[30] Foreign Application Priority Data

Jul. 9, 1993 [DE] Germany .................. 43 22 886.0

[51] Int. Cl.⁶ .................................................. C09C 1/22
[52] U.S. Cl. .......................... 106/456; 106/457; 106/460
[58] Field of Search .............................. 106/456, 457, 106/460; 428/403

[56] References Cited

U.S. PATENT DOCUMENTS

| | | | |
|---|---|---|---|
| 4,122,216 | 10/1978 | Okazoe et al. | 427/128 |
| 4,145,228 | 3/1979 | Croce et al. | 106/456 |
| 4,264,462 | 4/1981 | Buxbaum et al. | 252/62.53 |
| 4,375,373 | 3/1983 | Abe et al. | 106/403 |
| 4,429,066 | 1/1984 | Gilmer | 524/158 |
| 4,491,619 | 1/1985 | Biermann et al. | 428/403 |
| 4,551,491 | 11/1985 | Panush | 524/31 |
| 4,597,797 | 7/1986 | Roorda et al. | 106/194 |
| 4,696,763 | 9/1987 | Bentley et al. | 252/391 |
| 4,719,036 | 1/1988 | Clubley et al. | 252/391 |
| 4,725,499 | 2/1988 | Itoh et al. | 428/403 |
| 4,741,921 | 5/1988 | Kitaoka et al. | 427/127 |
| 4,913,063 | 4/1990 | Jonas et al. | 106/456 |
| 4,966,641 | 10/1990 | Westerhaus et al. | 106/456 |
| 5,143,548 | 9/1992 | Okura et al. | 106/460 |
| 5,143,671 | 9/1992 | Peters et al. | 264/117 |

OTHER PUBLICATIONS

*Ullmans Encyclopedia of Industrial Chemistry*, 5th. ed., vol. A20, pp. 298–299, Verlag Chemie (1992) (month unknown).
ISO 7724/3, Paints and Varnishes—Colorimetry—Part 3: Calculation of Colour differences (1984) (month unknown).
ISO/DIS 9277, *Draft International Standard, Determination of the Specific Surface Area of Solids by Gas Adsorption Using the BET Method* (1992) (month unknown).
*Ullmans Encyclopedia of Industrial Chemistry*, 5th. ed., vol. A20, pp. 330–331, Verlag Chemie (1992) (month unknown).
*United Nations Recommendations on the Transport of Dangerous Goods*, Seventh Revised Edition, p. 375 (date unknown).
Japanese Patent Abstract—"Production of Metallic Iron Particle Powder or Magnetic Alloy Particle Powder Essentially Consisting of Iron" Mishima et al. JP 61–288001 (Dec. 18, 1986).

*Primary Examiner*—Paul Marcantoni
*Attorney, Agent, or Firm*—Connolly and Hutz

[57] ABSTRACT

The present invention relates to iron oxide pigments with an Fe(II) content of at least 5 wt. %, calculated as FeO, which have at least one inorganic after-treatment layer and at least one organic after-treatment coating, a process for preparing these iron oxide pigments and their use.

14 Claims, No Drawings

THERMALLY STABLE IRON OXIDE PIGMENTS, A PROCESS FOR THEIR PREPARATION AND THEIR USE

CROSS REFERENCE TO RELATED APPLICATION

The present application is a File Wrapper Continuing application of U.S. patent application Ser. No. 08/269,560 filed on Jul. 1, 1994, now abandoned.

The present invention relates to iron oxide pigments with an Fe(II) content of at least 5 wt. %, calculated as FeO, which have at least one inorganic after-treatment layer and at least one organic after-treatment coating, a process for preparing these iron oxide pigments and their use.

Iron oxide pigments which contain iron in the oxidation state +2 are thermodynamically unstable phases as compared with iron(III) oxide, $Fe_2O_3$. They may be partially or completely oxidised in the presence of air or oxygen.

This type of reaction is known with, for example, iron oxide black pigments, which correspond to magnetite with respect to composition and structure. The pigment looses its most important property, that is its colour, due to oxidation and cannot then be used. The tendency to oxidise increases in line with the degree of fineness and thus with the specific surface area of the pigments.

The same applies to mixtures of iron oxide black with other iron oxide pigments, iron oxide red and iron oxide yellow, when they are produced for brown shades.

In the case of pigments it is the loss of coloristic properties which makes them unusable, and in the case of iron(II)-containing magnetic pigments it is the loss of magnetic properties, which is also caused by oxidation. Finely divided magnetite pigments and mixed phases of magnetite ($Fe_3O_4$) and magnetite ($\gamma$-$Fe_2O_3$) with a high iron(II) content are the main species at risk. However, mixed phases of magnetite and/or ferrites such as e.g. cobalt ferrite, and those magnetite pigments which are composed of a core of $Fe_3O_4$ and $\gamma$-$Fe_2O_3$ and a shell around this core made of magnetic metal oxides, in particular of iron and cobalt, are also sensitive to oxidation. In the specialist literature the compositions described here are called both "mixed phases" and "berthollides".

It is known from DE-A-2 744 598 that the sensitivity to oxidation of finely divided ferrimagnetic magnetite pigments is reduced by treatment with heterocyclic organic compounds. This treatment brings about a considerable improvement as compared with the untreated pigments, but this cannot be increased above a certain level. The heterocyclic compounds used are simply physically adsorbed onto the pigment and hence can affect water-soluble constituents. Incompatibilities can result in various binder systems due to this.

It is furthermore known, from EP-A-90 241, that boric acid can be used to stabilise iron(II)-containing iron oxides. Pigments stabilised with boric acid have a thermal stability comparable to that of pigments coated with heterocyclic compounds, with a simultaneous reduction in the water-soluble components.

The durability of known stabilised iron(II)-containing iron oxides from the prior art, however, must always be regarded as being inadequate.

The object of this invention is thus the provision of thermally stabilised iron(II)-containing iron oxide pigments which do not have the disadvantages described for known pigments.

Surprisingly, it has now been found that iron oxide pigments coated with oxides or hydroxides of boron, aluminium and/or silicon and with aromatic carboxylic acids of the general formula (I) have high thermal stabilities when compared with the prior art. The carboxylic acids used to coat the iron oxide pigments correspond to the general formula (I):

$$Ar-(COOX)_n$$

wherein

Ar represents an aromatic grouping optionally substituted with halogen $NH_2$, OH, NHR, $NR_2$, OR or R, where R represents a linear or branched alkyl group with 1 to 30 carbon atoms or an optionally substituted aryl group with 6 to 10 carbon atoms and X represents H, an alkali metal, $NR^1_4$, where $R^1$=H, an alkyl or an aryl group, ½ an alkaline earth metal, ⅓ Al or ⅓ Fe and n is an integer from 1 to 10.

Thus this invention provides iron oxide pigments with an Fe(II) content of at least 5 wt. %, calculated as FeO, which have at least one inorganic after-treatment layer and at least one organic after-treatment substance, which are characterised in that the inorganic after-treatment layer comprises oxygen and/or hydroxide compounds of boron, aluminium and/or silicon and the organic after-treatment substance is one or more compounds of the general formula (I)

$$Ar-(COOX)_n$$

wherein

Ar represents an aromatic grouping optionally substituted with halogen, $NH_2$, OH, NHR, $NR_2$, OR or R, where R represents a linear or branched alkyl group with 1 to 30 carbon atoms or an optionally substituted aryl group with 6 to 10 carbon atoms and X represents H, an alkali metal, $NR^1_4$, where $R^1$=H, an alkyl or an aryl group, ½ an alkaline earth metal, ⅓ Al or ⅓ Fe and n is an integer from 1 to 10.

Preferred basic skeletons for Ar are derived from benzene, naphthalene or anthracene. Preferred groups X are hydrogen, sodium, potassium or ammonium compounds.

Particularly preferred aromatic carboxylic acids which may be mentioned are: benzoic acid, 1,2-, 1,3-, 1,4-benzenedicarboxylic acid, 1,2,4-benzenetricarboxylic acid, 1,2,4,5-benzene-tetracarboxylic acid and 1- or 2-naphthoic acid.

The aromatic carboxylic acids may be present either separately or as a mixture.

This invention also provides iron oxide pigments with an Fe(II) content of at least 5 wt. %, calculated as FeO, and L* ≦42 in the building materials test, characterised in that the iron oxide pigments are stable in accordance with the modified Bowes-Cameron cage test.

According to this test, a substance is said to be stable when the temperature in the interior of the sample does not exceed 200° C. for a period of 24 hours.

The modified Bowes-Cameron basket test is performed under the following conditions, as described in "Recommendations on the Transport of Dangerous Goods", 7th edition, United Nations, page 375.

A hot air circulating type of oven with an inner volume of more than 9 litres and capable of controlling the internal temperature at 140±2° C. should be used.

Cubic sample containers of 25 mm and 100 mm side, made of stainless steel net with a mesh opening of 0.053 mm, with their top surface open, should be used. Each container is housed in a cubic container cover made from a stainless-steel net with a mesh opening of 0.595 mm and slightly larger than the sample container, so that the container fits in this cover. In order to avoid the effect of air circulation, another stainless-steel cage, made from a net with a mesh opening of 0.595 mm and 150×150×250 mm in size, should be further installed to house the cover.

Chromel-Alumel thermocouples of 0.3 mm diameter should be used for temperature measurement. One is placed in the centre of the sample and another between the sample container and the oven wall. The temperatures should be measured continuously.

The sample, powder or granular, in its commercial form, should be filled to the brim of the sample container and the container tapped several times. If the sample settles, more is added. If the sample is heaped it should be levelled to the brim. The container is housed in the cover and hung at the centre of the oven.

The oven temperature should be raised to 140° C. and kept there for 24 hours. The temperature of the sample should be recorded. The first test should be conducted with a 100 mm cube sample. Observations are made to determine if spontaneous ignition occurs or if the temperature of the sample exceeds 200° C. If negative results are obtained no further test is necessary. If positive results are obtained a second test should be conducted with a 25 mm cube sample to determine the data for packing group assignment.

Particularly preferred in the sense of this invention, are pigments according to the invention which have been coated with 0.1 to 10 wt. %, preferably 0.2 to 5 wt. % of boric acid and have been after-treated with 0.1 to 10 wt. %, preferably 0.2 to 5 wt. % of benzoic acid.

The iron oxide pigments with an iron(II) content which are to be stabilised are pigments such as iron oxide black and/or iron oxide brown, but they may also be magnetic pigments such as magnetite or mixed phases of magnetite and maghemite (berthollide iron oxides) and/or ferrites or magnetites or iron oxides with an oxidation state between magnetite and maghemite which are coated with magnetic metal oxides.

The preparation of such pigments is described in the literature and they can be obtained by many processes. Iron oxide black pigments are prepared on an industrial scale mainly by two methods (Ullmanns Encyklopedia of Industrial Chemistry, 5th ed., vol. A20, p. 298, Verlag Chemie GmbH, 1992): the precipitation method in which iron(II) salt solutions are precipitated with alkalis while introducing air at ca. 90° C. in the vicinity of the neutral point, until an Fe(III)/Fe(II) ratio of about 2 is reached, and the Laux method in which nitrobenzene is reduced to aniline with metallic iron and which can be controlled in such a way that densely coloured iron oxide black pigments are produced.

Depending on the method of preparation and the purity of the raw materials used, iron oxide black pigments contain variable amounts, usually up to 5 wt. %, of minor constituents such as e.g. $SiO_2$ or $Al_2O_3$.

Normally, the Fe(III)/Fe(II) ratio in market products also differs from the theoretical numerical value and is greater than 2, generally being between 2.3 and 3.0. By far the greatest number of iron(II)-containing iron oxide brown pigments are prepared by mixing iron oxide yellow and/or iron oxide red with iron oxide black (Ullmanns Encyklopedia of Industrial Chemistry, 5th ed., vol. A20, p. 298, Verlag Chemie GmbH, 1992). To prepare iron(II)-containing iron oxide magnetic pigments (Ullmanns Encyklopedia of Industrial Chemistry, 5th ed., vol. A20, p. 331, Verlag Chemie GmbH, 1992), $\alpha$-FeOOH or $\gamma$-FeOOH is generally used as the starting material, this being dried, dehydrated and reduced at 350° to 600° C. using hydrogen to give $Fe_3O_4$. Mixed phases of magnetite and maghemite (berthollides) can be obtained by partial oxidation of magnetite pigments under mild conditions. Mixed phase pigments (berthollides) of magnetite and maghemite and/or ferrites are usually prepared by co-precipitating metals which can form ferrites, such as e.g. Zn, Mn, Co, Ni, Ca, Mg, Ba, Cu or Cd as oxides or hydroxides during the preparation of FeOOH intermediates or by introducing them to finished FeOOH pigments and convening these. Those special magnetic pigments which are prepared by application of a coating of magnetic metal oxides, in particular of iron and cobalt, onto a core of $Fe_3O_4$ or an iron oxide with an oxidation state between $Fe_3O_4$ and $\gamma$-$Fe_2O_3$ (e.g. epitaxial coating DE-B22 35 383, DE-A-28 17 410), can also be protected. Application of the process according to the invention is not impaired by known measures against sintering which are conventionally used during the preparation of magnetic pigments or by after-treatments or metering.

Furthermore, the present invention provides a process for the preparation of the iron oxide pigments according to the invention.

The pigments according to the invention are obtainable by mixing iron oxide pigments with an Fe(II) content of at least 5 wt. %, calculated as FeO, which contain at least one compound of boron, aluminium and silicon with at least one compound of the general formula (I) and optionally milling the mixture.

An alternative process comprises precipitating barely soluble compounds of boron, aluminium and/or silicon onto iron oxide pigments with an Fe(II) content of >5 wt. %, calculated as FeO, in suspension, optionally separating, washing and drying these iron oxide pigments and then mixing them with a compound of the general formula (I) and optionally subsequently milling the mixture.

It may be advantageous to subject the iron oxide pigments thus obtained to heat treatment at 200 to 800° C. (DE-A-3 620 333) in a non-oxidising or weakly oxidising atmosphere.

The pigments being stabilised are preferably mixed or treated with those compounds of boron, aluminium and/or silicon which either are already oxide or hydroxide compounds or else are able to form these under the conditions used. The first group includes, inter alia, $H_3BO_3$, $B_2O_3$, $SiO_2$, $H_4SiO_4$, $Al_2O_3$, $AlOOH$, $Al(OH)_3$. The second group includes, for example, $B(OR)_3$, $B(NR_2)_3$, $Na_2SiO_3$, $Si(OR)_4$, $SiCl_4$, $AlCl_3$, $Al_2(SO_4)_3$, $NaAlO_2$ and $Al(OR)_3$, where R is an alkyl or aryl group.

The sequence for applying the after-treatment substances does not play a part in the thermal stabilisation process, so either the inorganic or the organic coating may be applied first, or simultaneous application is also possible.

In the case of conventional iron oxide black pigments with an iron(II) content between 20 and 28 wt. %, calculated as FeO, and a specific surface area between 12 and 18 $m_2/g$, measured using the BET nitrogen 1-point adsorption method (DIN 66 131/ISO 9277), it is generally sufficient to add enough oxide or hydroxide compound of boron, aluminium and/or silicon and compounds of the general formula (I) such that the amount of each in the treated pigment is 0.2 to 10 wt. %, preferably 0.3 to 2 wt. %.

Pigments used to store magnetic signals are more finely divided than iron oxide black pigments (BET surface areas, determined by the $N_2$ 1-point method, are larger than 18 $m^2/g$) and require, for the same iron(II) content, larger added amounts, corresponding to their specific surface areas which may easily exceed 40 m²/g.

If the iron(II) content is lower, as may be the case, for example, with the iron oxide magnetic pigments encased with magnetic metal oxides which are described above, then the amount added may be correspondingly smaller. Incidentally, the amount of treatment required in a particular case in order to achieve the desired degree of thermal stability can be determined without any difficulty by the person skilled in the art by means of a simple trial.

In the process according to the invention, the iron(II)-containing iron oxide pigments prepared in a way which is known per se are mixed with several after-treatments substances. The after-treatment substances are expediently brought into a finely divided state beforehand. However, they may also be admixed in the form of a solution or suspension in an aqueous and/or organic medium. Common industrial equipment is used for mixing, such as e.g. pneumatically operated mixers, blade mixers, screw mixers, drum mixers or cone mixers. Mixing may take place at room temperature or else at higher temperatures than room temperature. Generally, mixing takes place in the presence of air, but the use of inert gases such as e.g. nitrogen, is recommended in particular when using elevated temperatures. If only small amounts of after-treatment substances are mixed with large amounts of pigment, then pre-mixing may be advantageous. The mixture obtained is then optionally milled. Milling equipment of the most varied construction are suitable for this, e.g. roller mills, edge mills, pendulum roller mills, hammer mills, pin mills, turbomills, ball mills or jet mills. Milling may be performed at room temperature or at temperatures higher than room temperature, optionally under an inert gas such as e.g. nitrogen. The material is then optionally annealed at temperatures of up to 800° C. in an atmosphere which is inert or which contains only small amounts of oxygen.

In the process according to the invention, the iron(II)-containing iron oxide pigments prepared in a way which is known per se are initially treated in suspension with several after-treatment substances. Water is generally used as the suspension medium, in principle, however, the use of aqueous/organic or purely organic media is also possible. The after-treatment substances may be added at any time before, during or after preparation of the pigment suspension. Treatment may take place at room temperature or at a higher temperature, optionally under an inert atmosphere. The duration of treatment is preferably 1 minute to a few hours. The treated pigment is dried in a second process step. It has proven to be expedient to perform the drying procedure in such a way that the total amount of liquid is evaporated from the suspension. Spray-drying has proved to be very reliable for this. The treated, dried pigment is optionally milled as in the first process and then optionally annealed at temperatures of up to 800° C. in an atmosphere which is inert or contains only small amounts of oxygen.

By spray-drying the pigments being stabilised, stable iron oxide granules, such as are used e.g. for colouring concrete, may be produced in an advantageous manner.

Thermally stable iron(II)-containing iron oxide pigments which are mixtures of different iron oxide pigments are expediently produced, for cost reasons, in such a way that only those mixing partners which contain di-valent iron are protected against oxidation by one of the two processes according to the invention and only then are they mixed with the other iron oxide pigments. However, it is self-evident that it is also possible to subject the mixture of iron(II)-containing iron oxide pigments and iron(II)-free iron oxide pigments as a whole to one of the two processes according to the invention.

The thermally stable iron oxide colouring pigments, or mixtures of pigments, according to the invention are used in areas where it is intended to dye inorganic and/or organic materials.

The object of this invention is its use to impart colour during the production of plastic parts, lacquers and dispersion dyes or to colour inorganic building materials, such as e.g. plasters, concrete roofing tiles or sand-lime bricks. The thermally stable iron oxide magnetic pigments may also be advantageously used to manufacture recording materials of any type such as e.g. audio and video tapes, instrumentation tapes, computer tapes, magnetic boards, floppy magnetic disks, hard magnetic disks or drum stores.

EXAMPLES

Example 1

3 kg of a pigment prepared by the Laux process (BET specific surface area greater than 15 m²/g) are homogenised for 10 minutes with 30 g of boric acid and then for 50 minutes with 30 g of benzoic acid in a stirrer with mixing and kneading attachments and planetary drive, made by the Alexanderwerk company. The pigment is adjusted to a residual moisture content of 3%.

Example 2

3 kg of a pigment prepared by the Laux process (BET specific surface area greater than 15 m²/g) are homogenised for 60 minutes with a mixture of 30 g of boric acid and 30 g of benzoic acid in a stirrer with mixing and kneading attachments and planetary drive, made by the Alexanderwerk company. The pigment is adjusted to a residual moisture content of 3%.

Example 3

3 kg of a pigment prepared by the Laux process (BET specific surface area greater than 15 m²/g) are homogenised for 10 minutes with 30 g of boric acid and then for 50 minutes with a solution of 30 g of benzoic acid in 60 ml of NaOH in a stirrer with mixing and kneading attachments and planetary drive, made by the Alexanderwerk company. The pigment is adjusted to a residual moisture content of 3%.

Example 4

3 kg of a pigment prepared by the Laux process (BET specific surface area greater than 15 m²/g) are homogenised for 10 minutes with 30 g of boric acid and then for 50 minutes with 30 g of 4-hydroxybenzoic acid in a stirrer with mixing and kneading attachments and planetary drive, made by the Alexanderwerk company. The pigment is adjusted to a residual moisture content of 3%.

Example 5

2.45 kg of a pigment prepared by the one-step precipitation method (BET specific surface area =9.7m²/g) are homogenised for 10 minutes with 24.5 g of boric acid and then for 50 minutes with 24.5 g of benzoic acid in a stirrer with mixing and kneading attachments and planetary drive, made by the Alexanderwerk company. The pigment is adjusted to a residual moisture content of 3%.

Example 6

2.2 kg of a pigment prepared for magnetic recording purposes (BET specific surface area =21.7m²/g, PK 5113, commercial product from Bayer AG) are homogenised for 10 minutes with 22 g of boric acid and then for 50 minutes with 22 g of benzoic acid in a stirrer with mixing and kneading attachments and planetary drive, made by the Alexanderwerk company. The pigment is adjusted to a residual moisture content of 3%.

Example 7

1.5 kg of a pigment prepared by the Laux process (BET specific surface area =15 $m^2/g$) are slurried in 1500 ml of water in a 4 litre pot with a ground glass joint and adjusted to pH 12 with 83 ml of $Na_2SiO_3$ and 45% strength NaOH (corresponding to 60 g of $SiO_2$). At 60° C., the pH is adjusted to 8 over 8 hours and the mixture is then filtered, washed and dried.

1456 g of the thus after-treated pigment are homogenised for 60 minutes with 73.2 g of benzoic acid in a stirrer with mixing and kneading attachments and planetary drive, made by the Alexanderwerk company. The pigment is then adjusted to a residual moisture content of 3%.

Example 8

About 10 t of a pigment prepared by the Laux process (BET specific surface area: $11m^2/g$) are after-treated for 30 minutes with 100 kg of boric acid and then for a further 30 minutes with 100 kg of benzoic acid in a twin-screw counter-stream mixer (nominal volume $16m^3$, useful volume ca. $11m^3$, speed of rotation 15 $min^{-1}$), made by Schichau & Griep. The entire contents of the mixer are then milled on a Raymond mill (speed of rotation of separator: 85 $min^{-1}$). The residual moisture content of the pigment powder obtained is 3.0%.

Comparison

As comparison examples A1 and A2, the thermal stabilities of Bayferrox 330®, a commercial iron oxide product from Bayer AG (A1) and of mineral magnetite (A2) were also determined in a modified Bowes-Cameron basket test.

The colour and stability values of the iron oxides prepared by way of example are given in Table 1 below.

The colour value was determined in a barytes moulding (DIN 53 237). For this, 0.5 g of pigment and 10 g of barytes were placed in a ca. 250 ml shaking bottle. After the addition of 200 steel balls of 5 mm diameter this is shaken for 3 minutes using an automatic table rotating shaker and then the mixture was compressed to form a solid cylinder.

The CIELAB data (DIN 6164/ISO 7724/3) was determined using a colorimetric apparatus with an Ulbricht globe (conditions of illumination d/8, standard illuminant C/2) with inclusion of surface reflection.

In all determinations of L*, b* and a* values the Ceramic Standards "Deep Grey" and "Difference Grey" from the British Research Association, Ceramics Colour Standards—Series II, were also measured.

The thermal stability was determined using the modified Bowes-Cameron cage test at 140° C. A pigment was assessed as being stable when the interior of the sample did not exceed 200° C. over a period of 24 hours.

TABLE 1

| Pigment/Example | L* | b* | S(BET)* [$m^2/g$] | T(max)/ [°C.] | Stability criterion |
|---|---|---|---|---|---|
| Standard: Difference Grey | 59.2 | 2.1 | — | — | — |
| Standard: Deep Grey | 35.6 | 0.6 | | | |
| 1 | 39.7 | 1.9 | 15.1 | 152 | yes |
| 2 | 39.7 | 0.8 | 17.2 | 168 | yes |
| 3 | 39.6 | 0.9 | 17.2 | 162 | yes |
| 4 | 40.2 | 0.6 | 17.2 | 180 | yes |
| 5 | 38.7 | −0.8 | 9.7 | 148 | yes |
| 6 | 36.1 | 5.4 | 21.7 | 179 | yes |
| 7 | 42 | 0.8 | 17.2 | 175 | yes |
| 8 | 40.7 | 0.7 | 11.0 | 175 | yes |
| A1: Bayferrox 330 ® | 40.5 | 1 | 15 | 850 | no |
| A3: Mineral magnetite | 46.7 | −0.9 | 7.2 | 640 | no |

Bayferrox 330: Commercial product from Bayer AG
Difference Grey: British Ceramic Research Association: CERAMIC COLOUR STANDARDS - SERIES II
Deep Grey: British Ceramic Association: CERAMIC COLOUR STANDARDS - SERIES II
*) determined by the $N_2$ 1-point method (DIN 66 131/ISO 7724/3).

What is claimed is:

1. Iron oxide pigments with an Fe(II) content of at least 5 wt. %, calculated as FeO, which have at least one inorganic after-treatment layer and at least one organic after-treatment coating, wherein the inorganic after-treatment layer consists of oxygen and/or hydroxide compounds of boron, aluminum and/or silicon and the organic after-treatment coating consists of one or more compounds of the general formula (I)

Ar—(COOX)$_n$ (I)

wherein

Ar represents an aromatic grouping optionally substituted with halogen, $NH_2$, OH, NHR, $NR_2$, OR or R, where R represents a linear or branched alkyl group with 1 to 30 carbon atoms or an optionally substituted aryl group with 6 to 10 carbon atoms;

X represents H, an alkali metal, $NR^1_4$, where $R^1$=H, an alkyl or aryl group, ½ an alkaline earth metal, ⅓ Al or ⅓ Fe; and n is an integer from 1 to 10.

2. Iron oxide pigments according to claim 1 with an Fe(II) content of at least 5 wt. %, calculated as FeO, and an L* of ≦42 in the building materials test, wherein the iron oxide pigments are stable according to the modified Bowes-Cameron cage test.

3. Iron oxide pigments according to claim 1, wherein the pigments are coated with 0.1 to 10 wt. % of boric acid and have been after-treated with 0.1 to 10 wt. % of benzoic acid.

4. A process for the preparation of iron oxide pigments according to claim 1, wherein iron oxide pigments with an Fe(II) content of at least 5 wt. %, calculated as FeO, which contain at least one compound of boron, aluminum and silicon are mixed with at least one compound of the general formula (I) and optionally the mixture is milled.

5. A process for the preparation of iron oxide pigments according to claim 1, wherein barely soluble compounds of boron, aluminum and/or silicon are precipitated onto iron oxide pigments with an Fe(II) content of >5 wt. %, calculated as FeO, in suspension, these iron oxide pigments are subsequently mixed with a compound of the general formula (I) and optionally the mixture is milled.

6. A process for the preparation of iron oxides according to claim 4, wherein the iron oxide pigments are subsequently subjected to heat treatment at 200° to 800° C. in a non-oxidizing or weakly oxidizing atmosphere.

7. A method of using the iron oxide pigments according to claim 1, wherein said pigments are added to plastics, lacquers, dispersion dyes and building materials for coloring purposes.

8. A method of using the iron oxide pigments according to claim 1, wherein the pigments are attached to a substrate to produce magnetic recording media.

9. Iron oxide pigments according to claim 1, wherein the pigments are coated with 0.2 to 5 wt. % of boric acid and have been after-treated with 0.2 to 5 wt. % of benzoic acid.

10. A process for the preparation of iron oxide pigments according to claim 5, wherein after the barely soluble compounds of boron, aluminum and/or silicon are precipitated onto the iron oxide pigments in suspension, the iron oxide pigments are separated from the suspension and washed and dried before being mixed with the compound of general formula (I).

11. Iron oxide pigments according to claim 2, wherein the pigments are coated with 0.1 to 10 wt. % of boric acid and have been after-treated with 0.1 to 10 wt. % of benzoic acid.

12. A process for the preparation of iron oxide pigments according to claim 2, wherein iron oxide pigments with an Fe(II) content of at least 5 wt. %, calculated as FeO, which contain at least one compound of boron, aluminum and silicon are mixed with at least one compound of the general formula (I) and optionally the mixture is milled.

13. A process for the preparation of iron oxide pigments according to claim 2, wherein barely soluble compounds of boron, aluminum and/or silicon are precipitated onto iron oxide pigments with an Fe(II) content of >5 wt. %, calculated as FeO, in suspension, these iron oxide pigments are subsequently mixed with a compound of the general formula (I) and optionally the mixture is milled.

14. A process for the preparation of iron oxides according to claim 5, wherein the iron oxide pigments are subsequently subjected to heat treatment at 200° to 800° C. in a non-oxidizing or weakly oxidizing atmosphere.

* * * * *